US008885636B2

(12) United States Patent
Grunwald et al.

(10) Patent No.: US 8,885,636 B2
(45) Date of Patent: Nov. 11, 2014

(54) METHOD AND SYSTEM FOR PLATFORM-INDEPENDENT VOIP DIAL PLAN DESIGN, VALIDATION, AND DEPLOYMENT

(75) Inventors: Bernard A. Grunwald, Raleigh, NC (US); Shang Q. Guo, Cortlandt Manor, NY (US); Gopal S. Pingali, Mohegan Lake, NY (US); Zon-Yin Shae, Hawthorne, NY (US); Shu Tao, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 12/551,930

(22) Filed: Sep. 1, 2009

(65) Prior Publication Data
US 2011/0051715 A1 Mar. 3, 2011

(51) Int. Cl.
H04L 12/56 (2006.01)
H04L 29/06 (2006.01)
H04Q 3/00 (2006.01)
H04Q 3/42 (2006.01)
H04M 7/00 (2006.01)

(52) U.S. Cl.
CPC ........ *H04L 65/1069* (2013.01); *H04L 65/1006* (2013.01); *H04Q 3/0045* (2013.01); *H04M 7/006* (2013.01); *H04Q 3/42* (2013.01)
USPC ....................................... 370/352

(58) Field of Classification Search
None
See application file for complete search history.

(56) References Cited

U.S. PATENT DOCUMENTS

| | | | | |
|---|---|---|---|---|
| 5,598,458 A | * | 1/1997 | Bales et al. | 455/414.1 |
| 5,732,213 A | * | 3/1998 | Gessel et al. | 370/235 |
| 5,774,695 A | * | 6/1998 | Autrey et al. | 370/467 |
| 6,134,515 A | * | 10/2000 | Skogby | 379/9 |
| 6,154,533 A | | 11/2000 | Foelker | |
| 6,453,032 B1 | | 9/2002 | Lennert et al. | |
| 6,650,731 B1 | * | 11/2003 | Steltner et al. | 379/15.01 |
| 7,237,104 B2 | | 6/2007 | Philyaw | |
| 2003/0035416 A1 | * | 2/2003 | Zirojevic et al. | 370/357 |
| 2004/0208185 A1 | * | 10/2004 | Goodman et al. | 370/401 |
| 2005/0193103 A1 | | 9/2005 | Drabik | |
| 2005/0243809 A1 | | 11/2005 | Best et al. | |
| 2005/0271029 A1 | | 12/2005 | Iffland | |
| 2006/0008069 A1 | * | 1/2006 | Deo et al. | 379/221.06 |
| 2006/0098583 A1 | * | 5/2006 | Baker et al. | 370/252 |
| 2006/0177039 A1 | * | 8/2006 | Caballero-McCann et al. | 379/221.13 |
| 2006/0291643 A1 | * | 12/2006 | Pfaff et al. | 379/221.12 |
| 2008/0239968 A1 | * | 10/2008 | Olsen et al. | 370/241 |
| 2011/0038306 A1 | * | 2/2011 | Potkonjak | 370/328 |

OTHER PUBLICATIONS

VoIP-Info.Org. Visual Dialplan for Asterisk. Nov. 2008, (6 pages) www.voip-info.org/wiki/view/Visual+Dialplan+for+Asterisk.
Cisco Systems Inc. Cisco Dialed Number Analyzer, Release 3.3(4). Installing Cisco CallManager Dialed Number Analyzer; Accessing Dialed Number Analyzer; Analyzing Cisco CallManager Dial Plan Configuration. Prior to Aug. 2009. (28 pages) www.cisco.com/en/US/docs/voice_ip_comm/cucm/dna/3_3_4/dnains.html.

* cited by examiner

*Primary Examiner* — Gregory Sefcheck
*Assistant Examiner* — Joshua Smith
(74) *Attorney, Agent, or Firm* — Tutunjia & Bitetto, P.C.; Louis J. Percello

(57) ABSTRACT

A system and method for designing a dial plan for Voice over Internet Protocol (VoIP) systems includes generating an abstract dial plan design which is platform independent, the dial plan including rules for routing communications in a VoIP network structure. The dial plan is validated through simulations prior to deployment to evaluate the dial plan performance under simulated conditions. The dial plan design is translated to provide compatibility with a deployed network using platform specific configuration adaptors.

18 Claims, 6 Drawing Sheets

METHOD AND SYSTEM FOR PLATFORM-INDEPENDENT VOIP DIAL PLAN DESIGN, VALIDATION, AND DEPLOYMENT

BACKGROUND

1. Technical Field

The present invention relates to Voice over Internet Protocol (VoIP) dial plans and more particularly to systems and methods for designing and validating dial plans for VoIP applications and systems.

2. Description of the Related Art

A call routing scheme is a key design task in the deployment of Voice over Internet Protocol (VoIP) and determines how calls are routed in VoIP networks. A VoIP network covers one or multiple sites. At each site, routing of VoIP calls is controlled by one or a cluster of call-routing servers (e.g., CallManager in a CISCO® architecture). A call routing scheme is represented by a set of configurations in these servers.

The design of call routing schemes is performed manually. An expert may design the scheme using various visual tools and then configure the call-routing servers based on his design. After all the servers are configured, the designer may run test calls on the configured servers to check whether the routing performs as expected. If routing does not perform as expected, the designer needs to identify and correct the errors in the design or configurations. For example, in a CISCO® architecture, the verification of the call routing scheme (called Dial Plan or Route Plan) is provided using a Dial Number Analyzer (DNA) tool integrated with a Call Manager.

A main drawback of the present systems is that such systems are error-prone. The errors can come from the design phase, i.e., the designer may come up with an incorrect routing scheme design or from the configuration phase, i.e., although the design is correct, mistakes were made when configuring the server due to human error. All of these errors can cause extended design and implementation cycles in VoIP network deployments.

A dial plan is a set of routing policies that dictate the routing of VoIP calls from caller to callee. A dial plan is typically represented as a set of complex configurations inside call routing servers (e.g., a CISCO® CallManager). The dial plan design is complex and requires in-depth knowledge of the deployment platform. Dial plan validation is also difficult and can only be done after deployment and is time consuming because it is a manual process and is error-prone.

SUMMARY

A system and method for designing a dial plan for Voice over Internet Protocol (VoIP) systems includes generating an abstract dial plan design which is platform independent, the dial plan including rules for routing communications in a VoIP network structure. The dial plan is validated through simulations prior to deployment to evaluate the dial plan performance under simulated conditions. The dial plan design is translated to provide compatibility with a deployed network using platform specific configuration adaptors.

A system for designing a dial plan for Voice over Internet Protocol (VoIP) network includes a computer device having a user interface, the user interface being configured to enable a user to define rules of an abstract dial plan, which is platform-independent, and translate a graphic description of the rules into a computer language in memory of the computer device. A dial plan validation tool is configured to validate the abstract dial plan design with simulated call routing results prior to deploying the abstract dial plan design. At least one set of platform-specific adaptors is configured to translate the abstract dial plan design to platform-specific configurations for deployment in the VoIP network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
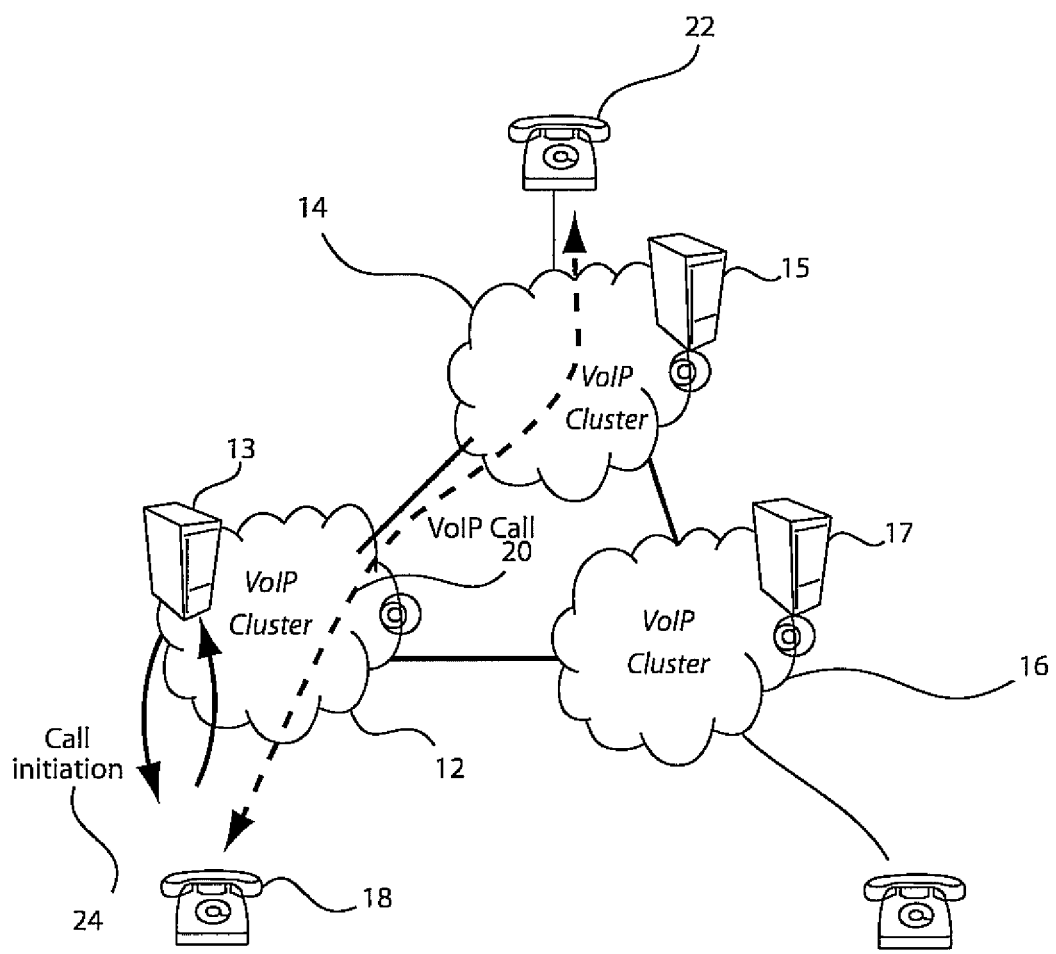
FIG. 1 is a diagram showing dial plan routing in accordance with an illustrative embodiment.

The present principles provide a software-based tool that can capture, simulate, and debug a call routing scheme, without having the scheme actually configured into call routing servers. Using this tool, VoIP designers can conceptualize and detail the design, and test it before staff time is wasted in the configuration of the servers. Since the manual configuration of the server and debugging is the most time-consuming step in the process of VoIP deployment, this tool can significantly improve the efficiency of the design process. Other advantages include simulating call routing across multiple sites or clusters. This can be contrasted with the existing tools which only analyze call routing in a single site or cluster.

In accordance with useful embodiments, a platform-independent, abstract dial plan description and design system is provided. Vendor-specific dial plan configurations may be employed. Dial plan validation may be performed off-line and in advance of server configuration so that the design can be validated before, rather than after deployment. The present principles may include automated translation from an abstract dial plan design to a vendor-specific configuration(s). Advantageously, there is no need for knowledge of specific platforms. Then, call-routing servers may be automatically configured using the dial plan design such that there is no need for manual configurations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) maybe utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a network 10 is illustratively depicted to demonstrate aspects of the present embodiments. Network 10 preferably includes an Internet Protocol (IP) network employed to carry data and voice information. The network 10 includes one or more VoIP clusters, for example, clusters 12, 14, and 16. Clusters 12, 14 and 16 each include a server 13, 15 and 17, respectively, that handles and assists in controlling communications within and through each cluster. Clusters 12, 14 and 16 include network infrastructure including telephone wires, wireless devices, cables, routing hardware, software applications, virtual circuits, switches and the like for connecting callers to callees within and through the IP network 10.

In one illustrative example, a caller 18 initiates a VoIP call 20 to a callee 22. The caller 18 goes through a call initiation procedure 24 with its local server 13. In accordance with the present principles, the call is routed in accordance with the pre-deployed design plan or abstract design. Since the dial plan was pre-tested, an efficient and predictable call result is provided. Further, since the network is simulated, changing conditions or configurations can easily be accommodated for rerouting or redesigning the dial plan.

Figure 2:
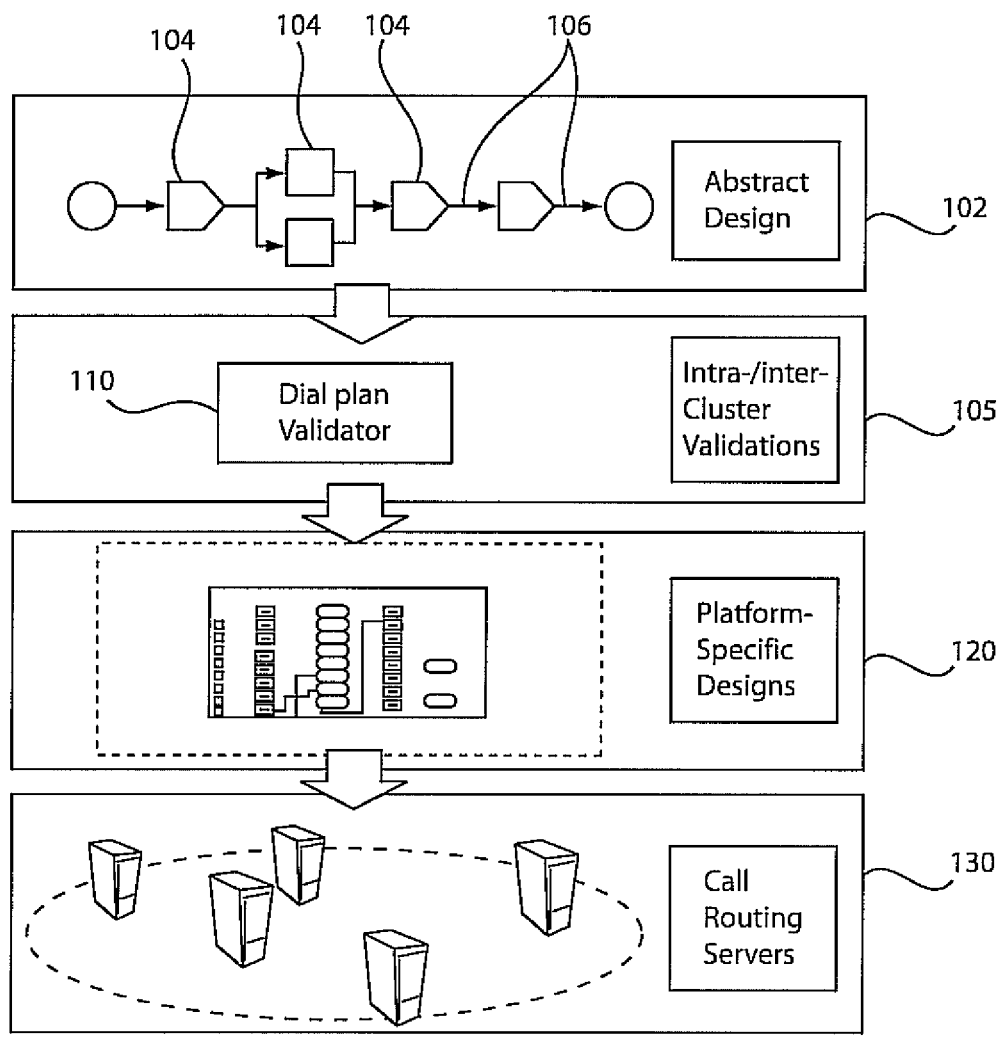
FIG. 2 is a block diagram showing a high-level flow for designing, validating and deploying a dial plan in accordance with the present principles.

Referring to FIG. 2, a high-level flow diagram for a dial plan tool describes aspects of one illustrative embodiment in accordance with the present principles. In block 102, an abstract design is created. The abstract design may be created based on typical network infrastructures or may use specific information regarding locations, addresses, existing hardware and software, etc. The abstract design for the dial plan is preferably platform-independent which means that at the design level, conceptual routing plans are employed. The dial plan tool may include a graphical user interface that permits application of design features 104 and permits connections and routing links 106 to design the dial plan. Features 104 and connections/links 106 may graphically represent policies or procedures needed for routing calls in a particular environment. For example, a policy may include user specific information, call plan information, long distance, regional or local plans, rules, information and any other restrictions or conditions.

Use of a computer script or languages captures the design of the VoIP call routing scheme. This can be based on standard languages (e.g., XML) or proprietary languages specifically designed for the present purposes. The design is input to a computer or workstation by the designer. The design may be adjusted, reconfigured, stored, cut and pasted, or be subject to any other editing process.

In block 105, a software simulator program or dial plan validator 110 is employed to check the design input from block 102. The validator 110 takes input from the user (e.g., the dialed number, the dialing number, the dialing device, etc.) and analyzes a call routing procedure based on a captured call routing scheme, and then generates a set of routing options based on the analysis. The simulated call routing can occur both inside a single site/cluster and/or across multiple sites/clusters and therefore provides intra and inter cluster validations. The user interface permits designers to enter input parameters for the simulator and obtain simulation results to verify or adjust the dial plan design in accordance with the validator results. The validator 110 understands the rules and policies for which the call, caller, and callee are subject to. The validator 110 may also understand network conditions, bottlenecks, etc. This may be specific or be conditionally added in case certain conditions are experienced. As an example, the design may not specifically have a known bottleneck in a network, but the dial plan may have a conditional trigger such that if a certain network condition is experienced, the dial plan is automatically updated or adjusted accordingly (e.g., calls are rerouted, etc.).

Advantageously, dial plan validation may be performed off-line and in advance of actual deployment. This provides the opportunity to test and optimize the plan through simulation before deployment.

In block 120, the validated design may be translated to vendor or platform specific configurations. The dial plan design is embodied by high-level abstractions of routing policies. Different vendors may have defined different functional modules and configuration languages to implement these policies. The present embodiments include a translation engine that can automatically map the routing policies to vendor-specific languages or configurations. Advantageously, there is no need for knowledge of specific platforms since the design plan may be employed over the current platform specific configurations. In block 130, call-routing servers can automatically be configured in accordance with the designed dial plan. Call routing servers from different vendors typically have a programming interface (e.g., the Cisco Administrative XML Layer or AXL interface) that allows the configuration or reconfiguration of a dial plan. Using such interfaces, the dial plan configurations obtained in block 120 can be pushed into the call routing servers in batch mode. This eliminates manually configuring the servers.

Figure 3:
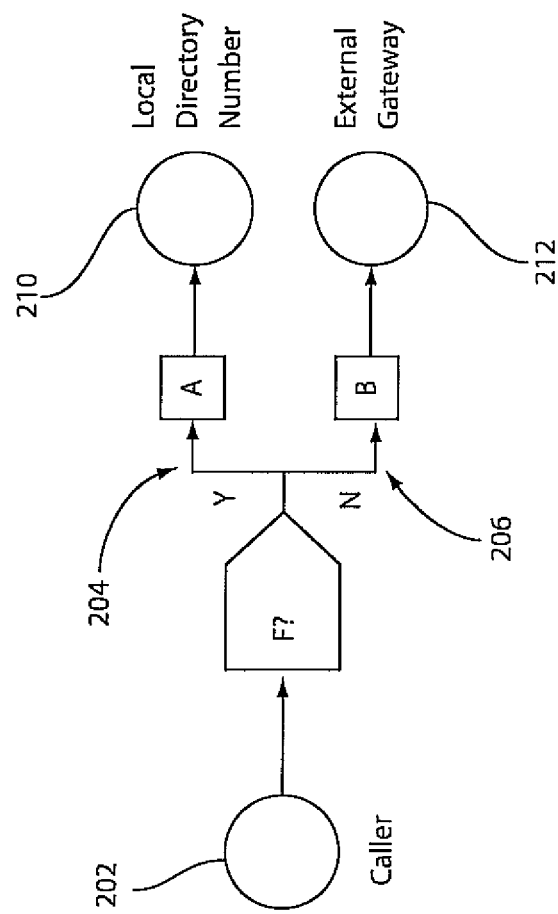
FIG. 3 is a block diagram showing an example abstract dial plan design in accordance with the present principles.

Referring to FIG. 3, an example of an abstract design is provided in accordance with an illustrative embodiment. In this example, a dial plan is created from a caller node 202 to one of a local directory path 204 or an external gateway path 206. From the caller 202, a policy, condition or status is checked in a node F. Node F determines whether a number pattern, e.g., 919147841234 matches the caller's dialed number. If yes, then the local directory path 204 is selected. In node A, a transformation is performed to transform number 919147841234 to simply the last four digits 1234 (a local directory call 210). If the determination in F is no, then the external gateway path 206 is selected. In node B, a transformation is performed to transform number 919147841234 to 19147841234 and the call is routed to an external gateway 212. This dial plan is significantly simplified and significantly more flexible then conventional dial plans.

For example, in a conventional dial plan, a call goes to a call search space to determine different routing options. This is initially performed manually. Route patterns are output. Then, for each route pattern a route list is determined for a call path. Next, a best route is selected and a dial plan is established for a given set of conditions or circumstances. This conventional methodology may not have an easy solution, requires knowledge of an existing configuration, is manually labor intensive and is error prone.

Figure 4:
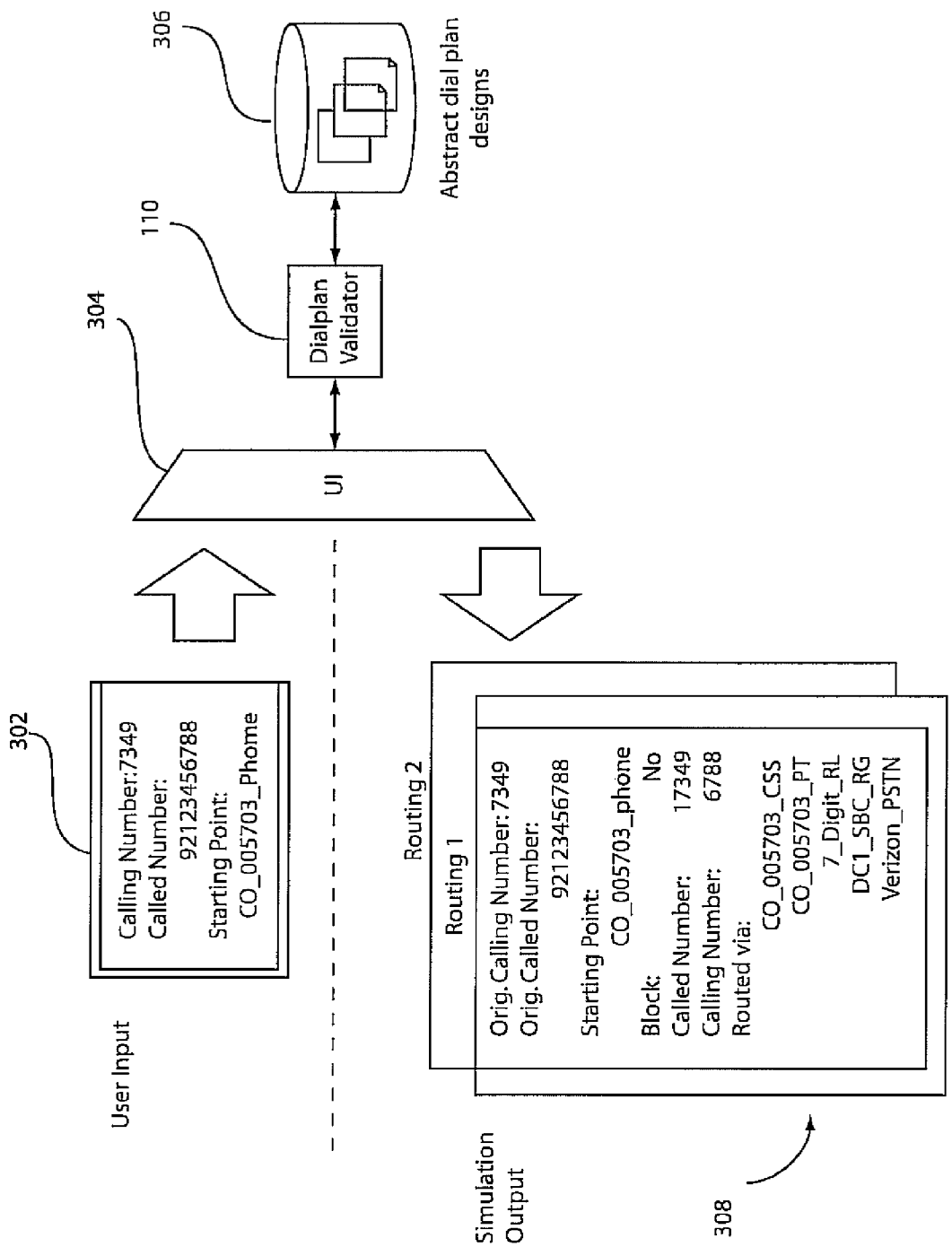
FIG. 4 is a diagram showing a dial plan validation in greater detail in accordance with the present principles.

Referring to FIG. 4, an example of a dial plan validation is provided in accordance with an illustrative embodiment. User or system generated input 302 is provided to a user interface (UI) 304. The input information may include a calling number, a called number, starting point information, etc. Other information may also be employed for the input. The input is provided to a dial plan validator 110 which analyzes the input and simulates call routing through actual or abstract dial plan designs stored in a memory storage device 306. The dial plan designs may include system provided designs or user designs. The different designs may be rated against one another and selected as a template. Templates may also be customized or partially customized using portions of other templates or template elements. A best routing design or plan may be selected or configured based on requirements.

The validator 110 validates a dial plan in accordance with the input and the UI outputs simulated routing information without having to deploy the dial plan routing scheme. Simulated output 308 includes routing plans or dial plans for a given input. The output may include information from the input including the calling number, the called number, the starting point, etc. In addition, other information output may include whether the call should be blocked, transformed calling or called numbers, and a route list through a network.

Figure 5:
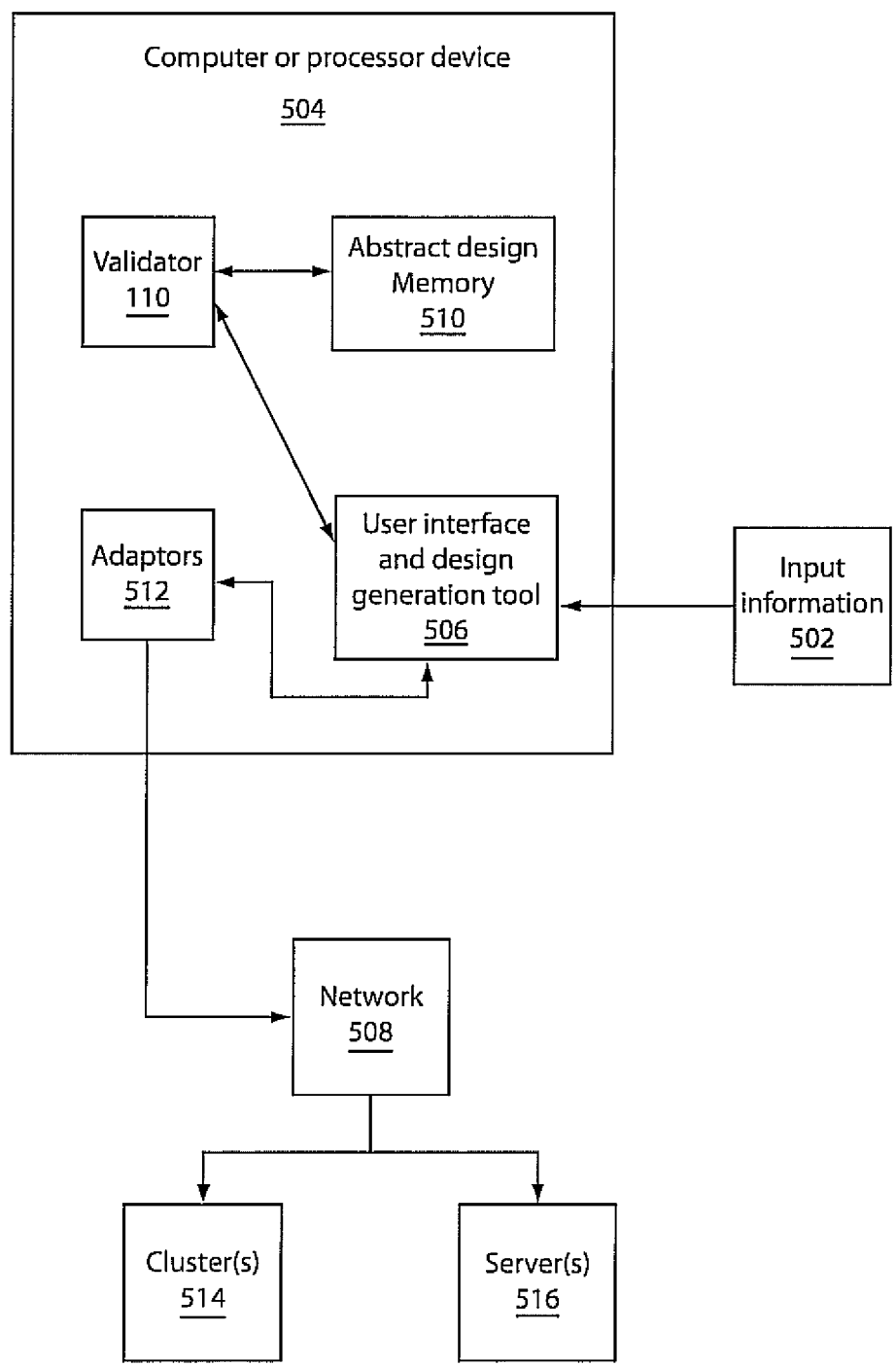
FIG. 5 is a block diagram showing a system for designing, validating and deploying a dial plan in accordance with the present principles.

Referring to FIG. 5, a system 500 for platform-independent VoIP dial plan design, validation, and deployment is illustratively shown. The system 500 provides the capability for defining abstract, platform-independent dial plans for the deployment of VoIP networks. The system 500 preferably employs a computer language (e.g., XML) that defines and captures the rules and policies represented in dial plan design. The system 500 includes a user interface 506 configured to provide a graphic interface for a user to conveniently define rules and policies and translate a graphic description of the design rules into the computer language. Input information 502 may include starting point information, rule or policies, conditions, call plan information, templates, stored designs, etc. The input 502 is employed in the user interface 506 to assist in designing a dial plan for a particular application. The dial plan may be saved in an abstract design memory 510.

The user interface 506 is employed with a computer or other processing device 504 to design and edit a dial plan.

Once designed, a dial plan can be simulated and validated using a validator 110. A dial plan validation tool or validator 110 allows the designer to validate the design with simulated call routing results. The validator 110 determines whether all rules and policies have been met and employs this information to output a routing scheme or routing options for the dial plan. If the results are not acceptable, the dial plan can be modified by the user at the user interface and the simulation may be performed again until acceptable results are achieved. A user can approve the dial plan for deployment.

In a deployment scenario, a set of platform-specific adaptors 512 may be employed that can translate abstract dial plan designs to platform-specific configurations. These adaptors 512 may be provided by network servers 516 or may be stored in memory accessible to the user interface 506. The system 500 can automatically configure call routing servers 516 on one or more clusters 514 using the generated platform-specific designs.

Figure 6:
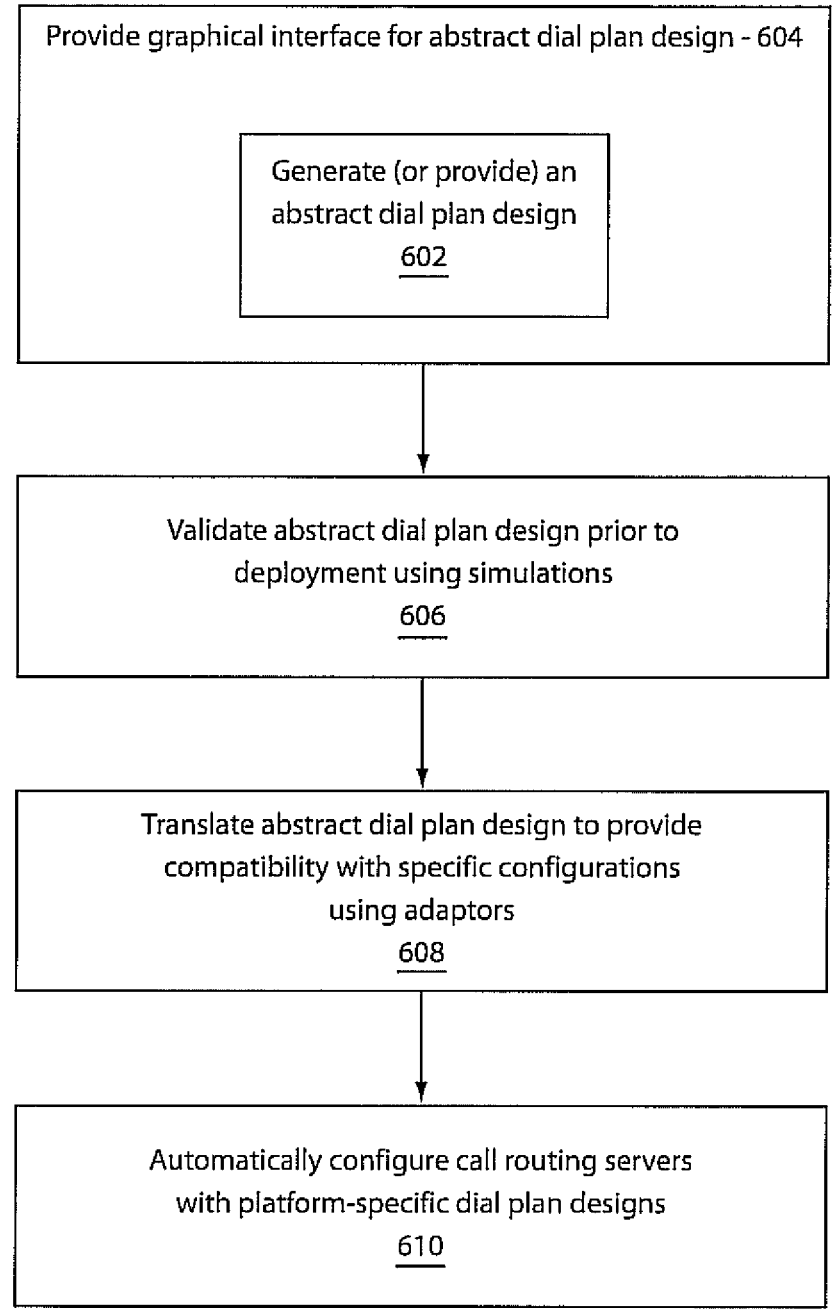
FIG. 6 is a flow diagram showing a system/method for designing, validating and deploying a dial plan in accordance with the present principles.

Referring to FIG. 6, a block/flow diagram is depicted for a system/method for designing, validating and deploying dial plans for Voice over Internet Protocol (VoIP) systems in accordance with an illustrative embodiment. In block 602, an abstract dial plan design is generated, which is platform independent. The dial plan design preferably includes employing a computer language to define and capture the rules and policies represented in the dial plan design. The dial plan design may be provided from memory or created by a user. The dial plan design includes rules for routing communications in a VoIP network structure. In block 604, a graphical user interface is provided to enable the generating and/or retrieving of the dial plan design.

In block 606, the dial plan design is validated using simulations prior to deployment to evaluate the dial plan performance under simulated conditions. Simulating the dial plan prior to deployment includes validating the dial plan design using a validation tool to analyze the dial plan. This may include validating the dial plan design concurrently for a plurality of clusters in the VoIP network. The plurality of clusters analyzed in the VoIP network may include both intra-cluster and inter-cluster call routing. The validation may include running test cases or simulating all call locations simultaneously. Many scenarios may be run to test/validate the dial plan in simulation. The dial plan can be modified, improved and adjusted to achieve peak performance and to understand the nature of the configuration.

In block 608, the dial plan design is translated to provide compatibility with a deployed network using platform specific configuration adaptors. In block 610, call routing servers are configured automatically using generated platform-specific dial plan designs.

Having described preferred embodiments of a system and method for platform-independent VoIP dial plan design, validation, and deployment (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for designing a dial plan for Voice over Internet Protocol (VoIP) systems, comprising:
generating an abstract dial plan design stored on memory media which is platform independent, the dial plan including rules for routing communications in a VoIP network structure, wherein if a number pattern matches a caller's dialed number, a local directory path is selected, otherwise an external gateway path is selected;
generating input information including a calling number, a called number, and starting point information;
simulating the dial plan, according to rules and policies for which a call, caller, and callee are subject to, prior to deployment by validating the dial plan design using a validation tool to evaluate the dial plan performance under simulated network conditions that include intra and inter cluster validations and bottlenecks;
adjusting the dial plan according to the network conditions;
rating the dial plan against other dial plan designs, wherein the rating is based on requirements;
translating the dial plan validated under simulated conditions to map routing policies of the dial plan design to platform specific configurations to provide compatibility with a deployed network using platform specific configuration adaptors ; and
configuring call routing servers using the platform-specific dial plan configurations.

2. The method as recited in claim 1, further comprising providing a graphical user interface to enable the generating of the dial plan design.

3. The method as recited in claim 1, wherein simulating the dial plan prior to deployment further comprises validating the dial plan design concurrently for a plurality of clusters in the VoIP network.

4. The method as recited in claim 3, wherein the plurality of clusters in the VoIP network include both intra-cluster and inter-cluster call routing.

5. The method as recited in claim 1, wherein generating the dial plan includes employing a computer language to define and capture the rules and policies represented graphically in the dial plan design.

6. The method as recited in claim 1, wherein the platform-specific dial plan configurations are pushed into the call routing servers in batch mode.

7. A non-transitory computer readable storage medium comprising a computer readable program for designing a dial plan for Voice over Internet Protocol (VoIP) systems, wherein the computer readable program when executed on a computer causes the computer to perform the steps of:
generating an abstract dial plan design which is platform independent, the dial plan including rules for routing communications in a VoIP network structure, wherein if a number pattern matches a caller's dialed number, a local directory path is selected, otherwise an external gateway path is selected;
generating input information including a calling number, a called number, and starting point information;
simulating the dial plan, according to rules and policies for which a call, caller, and callee are subject to, prior to deployment by validating the dial plan design using a validation tool to evaluate the dial plan performance under simulated network conditions that include intra and inter cluster validations and bottlenecks;
adjusting the dial plan according to the network conditions;
rating the dial plan against other dial plan designs, wherein the rating is based on requirements;
translating the dial plan validated under simulated conditions to map routing policies of the dial plan design to platform specific configurations to provide compatibility with a deployed network using platform specific configuration adaptors; and configuring call routing servers using the platform-specific dial plan configurations.

8. The non-transitory computer readable storage medium as recited in claim 7, further comprising providing a graphical user interface to enable the generating of the dial plan design.

9. The non-transitory computer readable storage medium as recited in claim 7, wherein simulating the dial plan prior to deployment further comprises validating the dial plan design concurrently for a plurality of clusters in the VoIP network.

10. The non-transitory computer readable storage medium as recited in claim 9, wherein the plurality of clusters analyzed in the VoIP network includes both intra-cluster and inter-cluster call routing.

11. The non-transitory computer readable storage medium as recited in claim 7, wherein generating the dial plan includes employing a computer language to define and capture the rules and policies represented in the dial plan design.

12. The non-transitory computer readable storage medium as recited in claim 7, wherein the platform-specific dial plan configurations are pushed into the call routing servers in batch mode.

13. A system for designing a dial plan for Voice over Internet Protocol (VoIP) network, comprising:
  a computer device having a user interface, the user interface being configured to enable a user to define rules of an abstract dial plan, which is platform-independent, and translate a graphic description of the rules into a computer language in memory of the computer device, and input a calling number, a called number, and starting point information;
  the dial plan includes rules for routing communications in a VoIP network structure, wherein if a number pattern matches a caller's dialed number, a local directory path is selected, otherwise an external gateway path is selected;
  a dial plan validation tool configured to validate the abstract dial plan design, according to rules and policies for which a call, caller, and callee are subject to, with simulated call routing results and with simulated network conditions, that include intra and inter cluster validations and bottlenecks, prior to deploying the abstract dial plan design, wherein the dial plan validation tool adjusts the dial plan according to the network conditions and rates the dial plan against other dial plan designs based on requirements;
  at least one set of platform-specific adaptors configured to translate the abstract dial plan design validated under simulated conditions to map routing policies of the abstract dial plan design to platform-specific configurations for deployment in the VoIP network; and
  call routing servers configured to the platform-specific dial plan designs using the platform-specific adaptors.

14. The system as recited in claim 13, wherein the abstract design plan includes nodes and links which represent caller and callee specific information and represent call paths through the VoIP network.

15. The system as recited in claim 13, wherein the dial plan validation tool analyzes the dial plan under simulated conditions to output routing schemes.

16. The system as recited in claim 13, wherein the VoIP network includes a plurality of clusters and the dial plan validation tool analyzes the plurality of cluster concurrently.

17. The system as recited in claim 16, wherein the plurality of clusters analyzed in the VoIP network includes both intra-cluster and inter-cluster call routing.

18. The system as recited in claim 13, wherein the platform-specific dial plan configurations are pushed into the call routing servers in batch mode.

* * * * *